3,049,546
PROCESS FOR THE DECARBALKOXYLATION OF ALKYL ESTERS OF UNSATURATED, NITROGEN-CONTAINING CARBOXYLIC ACIDS

Ulrich Renner, Riehen, near Basel, and Daniel A. Prins, Oberwil, Basel Land, Switzerland, assignors to Geigy Chemical Corporation, Ardsley, N.Y., a corporation of Delaware
No Drawing. Filed Mar. 4, 1960, Ser. No. 12,697
Claims priority, application Switzerland Mar. 5, 1959
6 Claims. (Cl. 260—294.7)

The present invention concerns a new process for the decarbalkoxylation of alkyl esters of unsaturated, nitrogen-containing carboxylic acids under mild reaction conditions.

It is known that alkyl esters of carboxylic acids having an unsaturated grouping in the β-position, in particular a carbonyl group, can be decarbalkoxylated in two steps, i.e. by alkaline hydrolysis to the free carboxylic acids and subsequent decarboxylation of these carboxylic acids, generally in an acid medium. The saponification step may have disadvantageous effects if the esters to be saponified are autoxidisable and have to be heated for longer periods of time in an alkaline medium so that, in many cases, particular precautions are necessary to minimise such autoxidative processes. If the decarboxylation is performed in an acid medium or at elevated temperatures and sensitive groups are present, undesirable side reactions may also occur.

It has now been found that N-monosubstituted β-aminocarboxylic acid alkyl esters having a double linkage between the β-carbon atom and either the γ-carbon atom or the nitrogen atom, namely when the amino group, its substituent as well as the β-carbon atom are members of a heterocyclic ring containing as structural element one of the following groupings:

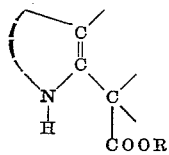

or

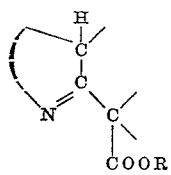

can be decarbalkoxylated in a one-step process by heating them with a base of the general formula $$R_1-NH_2 \quad (I)$$

wherein $R_1$ represents the amino group, an alkylamino, aralkylamino or cycloalkylamino group, an alkyl, aminoalkyl, hydroxyalkyl, cycloalkyl, aralkyl or aryl radical.

The reaction products as obtained in good yield by this process are already very pure. Suitable bases of the general Formula I are, for example, hydrazine, hydrazine hydrate, methyl hydrazine, isopropyl hydrazine, cyclohexyl hydrazine, benzyl hydrazine, propylamine, butylamine, amylamine, hexylamine, ethylenediamine, hydroxyethylamine, cyclohexylamine, benzylamine and aniline. Particularly suitable solvents are low molecular alkanols such as ethanol, propanol, isopropanol, butanols and amyl alcohols, but also other organic solvents such as, e.g. dioxan, 2-ethoxy ethanol or diethylene glycol dimethylether, ethylene glycol, propylene glycol, hydroxyethoxy ethanol, methoxyethoxyethanol, ethoxyethoxy ethanol, hydroxyethoxy ethanol dimethylether, hydroxyethoxy ethanol diethyl ether are suitable. The process has proved to be especially valuable for the decarbalkoxylation of certain indole alkaloids such as voacangine, isovoacangine, voacrystine or 12,13-dimethoxy coronaridine whereby in parparticular on using hydrazine as such or in the form of the hydrate as base, autoxidative processes can be avoided even without taking any particular additional precautions. The esteralkaloids given in the examples can be obtained from plants by methods known per se; up to now they have been found mainly in genera belong to the Apocynaceae family, in particular in the sub-tribe Tabernaemontaninae. 12,13-dimethoxy coronaridine and 12,13-dimethoxy ibogamine have not been previously described. The former compound is isolated from *Conopharyngia durissima* Stapf and the latter is obtained from the former by decarbomethoxylation according to the invention. 12,13-dimethoxy coronaridine and 12,13-dimethoxy ibogamine act on the central nervous system. Both substances potentiate the action of analgesics such as morphine and aminopyrine and also themselves have an analgesic action. In addition, they potentiate the catatonia-producing action of bulbocapnine, but only 12,13-dimethoxy coronaridine has itself a catatonic action. Whereas 12,13-dimethoxy coronaridine barely affects heart rate and blood pressure, 12,13-dimethoxy ibogamine moderately lowers blood pressure and furthermore slows the heart rate. 12,13-dimethoxy ibogamine can be used, therefore, as a central stimulant without producing such undesired side effects as tachycardia, commonly observed after stimulants as, for example, amphetamine or methedrine. Frequently, application of the process according to the invention on alkaloids from Apocyanaceae plants of the sub-tribe Tabernaemontaninae which can be decarbalkoxylated, furnishes products which have qualitatively changed, sometimes even opposed biological properties. Also, the process often enables the production of valuable alkaloids, which up to now have been found in nature only in small quantities, from those which from past experience occur in larger amounts, thus, for example, the conversion of voacangine into ibogaine.

The following examples further illustrate the process according to the present invention but in no way represent the only methods of performing same. Parts are given therein as parts by weight and their relationship to parts by volume is as that of grammes to cubic centimetres. The temperatures are in degrees centigrade.

Example 1

75 parts of voacangine, 400 parts of hydrazine hydrate and 400 parts of ethanol are refluxed for 48 hours. After cooling, 48.3 parts of crystals (M.P. 149–151°) have separated out. Mixed with ibogaine there is no depression of the melting point. The crystals are separated by filtration. The filtrate is evaporated to dryness, the residue is taken up in diethyl ether (also other solvents which are immiscible with water can be used such as hydrocarbons, ethers, esters, halogenated hydrocarbons), the ethereal solution is washed with water, the organic phase is separated, dried and concentrated. The crystalline residue (3 parts) also consist of ibogaine, M.P. 145–147°. Insted of hydrazine hydrate, hydrazine can be used in an analogous manner.

Example 2

3 parts of voacangine, 20 parts of hydrazine hydrate and 16 parts of dioxan are refluxed for 48 hours and the solution is then evaporated in vacuo. The residue is taken up in a solvent which is immiscible with water according to Example 1 and is washed with water. The evaporation residue obtained from the organic phase is triturated with 3 parts of a low alkanol, preferably methanol, whereupon unchanged voacangine crystallises out.

Fractional crystallisation of the mother liquors from aqueous ethanol yields ibogaine, M.P. 148–150°.

Example 3

10 parts of voacangine, 90 parts of ethylenediamine and 200 parts of ethanol are refluxed for 48 hours. After evaporating the solution in vacuo and triturating the residue with a low molecular alcohol such as methanol, voacangine crystallises out. The mother liquors are evaporated to dryness and the residue is separated by countercurrent distribution (19 steps, benzene/ether (1:1); buffer pH 4.3) into ibogaine, M.P. 148–150°, which is obtained from fractions 3–10 and into unchanged voacangine which is found in fractions 16–19.

Example 4

10 parts of voacangine, 90 parts of ethylenediamine and 200 parts of dioxan are refluxed for 48 hours. After evaporation of the solution, the residue is separated by countercurrent distribution (23 steps, benzene/ether (1:1), buffer pH 4.5) into ibogaine, M.P. 150–152° (obtained from fractions 6–14) and into unchanged voacangine.

Example 5

54 parts of voacristine (M.P. 112–114°, see U. Renner, Experientia 13, 468 (1957)), 325 parts of hydrazine hydrate and 270 parts of ethanol are refluxed for 48 hours. During this time, crystals precipitate which, after slowly adding 200 parts of water and cooling, are filtered off under suction at about 0°. The crystals form 32.7 parts of decarbomethoxyvoacristine, M.P. 234–236°, $[\alpha]_D^{24}=$ —10.5° (in ethanol).

Example 6

(a) 2800 parts of ground bark of *Conopharyngia durissima* Stapf are percolated with 20,000–25,000 parts by volume of methanol and the extract, concentrated to about 1000 parts by volume, is stirred into 3000 parts by volume of 10% acetic acid. Precipitated resins are decanted off and the solution, de-fatted by extraction with petroleum ether, is extracted with 10,000 parts by volume of chloroform in 5 portions. The evaporation residue of the chloroform extract is taken up in 1000 parts by volume of 10% acetic acid, the acetic acid solution is filtered if necessary, the pH is brought to 10–12 with ammonia and the solution is extracted with benzene. The residue of the benzene extract (7.5 parts by weight) is chromatographed through a column containing 225 parts by weight of aluminium oxide of activity I. After developing the chromatogramme with 3000 parts by volume of benzene/petroleum ether (1:1), first a substance melting at 155–156° from methanol in the form of needles is eluted with benzene (1000 parts). The other benzene fractions contain 12.13-dimethoxy coronaridine:

$$C_{23}H_{30}N_2O_4$$

from methanol, solid polyhedra, M.P. 141–143°, $[\alpha]_D^{25}=$ —40.5° (in chloroform), $\lambda_{max}$ 224.5 m$\mu$ (log $\epsilon$=4.47), $\lambda_{max}$ 304 m$\mu$ (log $\epsilon$=4.05).

(6) 6 parts of 12,13-dimethoxy coronaridine, 40 parts of hydrazine hydrate and 20 parts of ethanol are refluxed for 24 hours. After cooling, crystals have separated out and they are filtered off. They comprise 4 parts of 12,13-dimethoxy ibogamine, melting points 136° (from methanol) and 147° (from ether/petroleum ether), $[\alpha]_D^{22}=$ —42.6° (in chloroform), $\lambda_{max}$ 228 m$\mu$ (log $\epsilon$=4.42), $\lambda_{max}$ 304 m$\mu$ (log $\epsilon$=3.99).

Example 7

140 parts of crude isovoacangine (M.P. 145–150°, isolation from Stemmadenia Donnell-Smithii, described by F. Walls, O. Collera, A. Sandoval, Tetrahedron 2, 173 (1958)), are refluxed for 24 hours with 1500 parts of ethanol and 100 parts of hydrazine hydrate, whereby a crystalline precipitate forms. After cooling, the crystals are filtered off and about 100 parts of almost pure tabernanthine of M.P. 204–207° (after sintering from 198°) are obtained. After recrystallisation from methylene chloride/methanol the pure tabernanthine melts at 207–209°.

Example 8

15 parts of voacangine in 100 parts of anhydrous ethanol and 130 parts of ethanolamine are refluxed for 48 hours in a nitrogen atmosphere. The solution is then evaporated to dryness in vacuo. The residue is triturated with water and the aqueous suspension is extracted with ether. The ether extract is washed with water whereupon 13 parts of crude but crystalline ibogaine remain. On recrystallisation from methanol, pure ibogaine (M.P. 148–150°) is obtained.

Example 9

15 parts of voacangine in 100 parts of anhydrous ethanol and 200 parts of benzylamine are refluxed for 48 hours in a nitrogen atmosphere. The reaction mixture is then evaporated to dryness in vacuo and the residue is purified by crystallisation from methanol or, better, by countercurrent distribution. In the latter case, 7.71 parts of crude voacangine and 5.48 parts of crude ibogaine are obtained from which pure ibogaine (M.P. 149–151°) is obtained by recrystallisation from methanol.

Example 10

2 parts of voacangine, 20 parts by volume of diethylene glycol dimethyl ether, 2 parts by volume of water and 20 parts by volume of methylhydrazine are refluxed for 32 hours. After cooling to room temperature, water is added (150 parts by volume) and the resulting suspension is extracted with ether (150 parts by volume). After washing twice with water (50 parts by volume) and drying over sodium sulphate, the solvent is evaporated. The residue (2.1 parts) is subjected to countercurrent distribution (26 transfers; benzene/ether (1:1); buffer pH 4.63) giving crude but crystalline ibogaine in fractions 8–19 (1.61 parts); recrystallised from methanol, M.P. 151–153°. On using ethylene glycol as solvent, ibogaine is obtained in the same manner.

Example 11

5 parts of voacangine, 50 parts by volume of ethoxyethanol, 5 parts by volume of water and 50 parts by volume of n-amylamine are refluxed under nitrogen for 48 hours. The solution is concentrated in vacuo, water (300 parts) is added and the aqueous solution is extracted with benzene. The benzene phase is washed with water, dried and evaporated. The evaporation residue is subjected to countercurrent distribution as set forth in Example 10 and ibogaine, M.P. 149–151°, is obtained from fractions 8–19. Unreacted vocangine is recovered from fractions 21–26.

Example 12

3 parts of voacangine, 30 parts by volume of cyclohexylamine and 30 parts by volume of 95% ethanol are refluxed for 48 hours. After removal of ethanol and cyclohexylamine in vacuo, the residue is taken up in ether, washed with water, the solvent is removed and the residue is subjected to countercurrent distribution according to Example 10 whereby ibogaine, M.P. 148–150°, is isolated from fractions 9–17.

What we claim is:

1. 12,13-dimethoxy ibogamine.
2. Process for the decarbalkoxylation of an indole alkaloid selected from the group consisting of voacangine, isovoacangine, voacristine and 12,13-dimethoxy coronaridine, comprising heating, at reflux temperature, said alkaloid in a solvent selected from the group consisting of lower alkanol, lower alkandiol, lower alkoxy ethanol, diethylene glycol, lower monoalkyl ether of diethylene glycol, lower dialkyl ether of diethylene glycol and dioxan, with a base of the formula $$R_1-NH_2$$

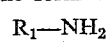

wherein $R_1$ represents the amino group, lower alkylamino, lower alkyl, lower aminoalkyl, lower hydroxyalkyl, cycloalkyl and benzyl.

3. Process as claimed in claim 2, wherein the base is hydrazine hydrate.

4. Process as claimed in claim 2, wherein the base is methyl hydrazine.

5. Process as claimed in claim 2, wherein the base is ethanolamine.

6. Process as claimed in claim 2, wherein the base is ethylenediamine.

References Cited in the file of this patent

Janot et al.: Acad. des. Sci., Compte Rendus, vol. 241 (1955), pages 986–7.

Bartlett et al.: Journ. Amer. Chem. Soc., vol. 80 (Jan. 5, 1958), pages 130–1.